United States Patent
Li et al.

(10) Patent No.: US 10,038,527 B2
(45) Date of Patent: Jul. 31, 2018

(54) METHOD FOR ENSURING CHANNEL CONTINUITY AFTER PRECODING, BASE STATION, UE, AND COMPUTER READABLE STORAGE MEDIUM

(71) Applicant: ZTE Corporation, Shenzhen, Guangdong (CN)

(72) Inventors: Yujie Li, Shenzhen (CN); Baoyu Sun, Shenzhen (CN); Yajun Zhao, Shenzhen (CN); Peng Geng, Shenzhen (CN); Shupeng Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 71 days.

(21) Appl. No.: 14/781,815

(22) PCT Filed: Dec. 30, 2013

(86) PCT No.: PCT/CN2013/090970
§ 371 (c)(1),
(2) Date: Oct. 1, 2015

(87) PCT Pub. No.: WO2014/166291
PCT Pub. Date: Oct. 16, 2014

(65) Prior Publication Data
US 2016/0065340 A1    Mar. 3, 2016

(30) Foreign Application Priority Data

Apr. 10, 2013   (CN) .......................... 2013 1 0123247

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04B 7/0686* (2013.01);
(Continued)

(58) Field of Classification Search
CPC ........... H04W 72/042; H04W 72/0413; H04W 72/0453; H04W 24/10; H04W 24/02; H04W 48/12; H04W 52/325; H04W 72/04
See application file for complete search history.

(56) References Cited

U.S. PATENT DOCUMENTS

2008/0192846 A1   8/2008  Bjerke
2011/0170498 A1   7/2011  Liu
(Continued)

FOREIGN PATENT DOCUMENTS

CN    101674275 A    3/2010
CN    101931442 A    12/2010
(Continued)

OTHER PUBLICATIONS

Supplementary European Search Report in European application No. 13881523.8, dated Jun. 1, 2016, 15 pgs.
(Continued)

*Primary Examiner* — Asad Nawaz
*Assistant Examiner* — Najeebuddin Ansari
(74) *Attorney, Agent, or Firm* — Cooper Legal Group, LLC

(57) ABSTRACT

Disclosed are a method for ensuring channel continuity after precoding, a base station, a user equipment (UE), and a computer readable storage medium. The method comprises: the base station notifying the UE of whether a precoding manner with a continuous frequency domain is used in data sent to the UE by the base station, and the base station sending data to the UE according to a precoding manner
(Continued)

```
┌─────────────────────────────────────────────────────┐
│ an eNB informs a UE whether data sent to the UE by the eNB are │──101
│ precoded according to frequency-domain continuous Precoding    │
└─────────────────────────────────────────────────────┘
                          │
                          ▼
┌─────────────────────────────────────────────────────┐
│ the eNB sends the UE data that are precoded according to the   │──102
│ frequency-domain continuous or discontinuous Precoding         │
│ accordingly as the UE is informed                              │
└─────────────────────────────────────────────────────┘
``` with a continuous or discontinuous frequency domain. The method further comprises: when the UE determines, according to the notification of the base station, that the precoding manner with a continuous frequency domain is used in the data sent to the UE by the base station, the UE executing an optimized channel estimation and demodulation manner within a processing capability of the UE.

12 Claims, 1 Drawing Sheet

(51) Int. Cl.
    *H04L 25/02*     (2006.01)
    *H04W 72/04*     (2009.01)
    *H04B 7/06*     (2006.01)

(52) U.S. Cl.
    CPC ....... *H04L 25/0202* (2013.01); *H04W 72/042* (2013.01); *H04B 7/0617* (2013.01)

(56) References Cited

U.S. PATENT DOCUMENTS

| | | | |
|---|---|---|---|
| 2011/0255483 A1 | 10/2011 | Xu | |
| 2011/0310831 A1 | 12/2011 | Bhattad | |
| 2012/0147984 A1 | 6/2012 | Bjerke | |
| 2012/0188962 A1 | 7/2012 | Gao | |
| 2013/0301570 A1* | 11/2013 | Xu | H04L 5/0073 370/329 |
| 2014/0328327 A1* | 11/2014 | Xiao | H04W 36/0088 370/332 |
| 2015/0172949 A1* | 6/2015 | Lee | H04B 17/309 370/252 |
| 2015/0207552 A1* | 7/2015 | Nammi | H04B 7/0413 370/281 |
| 2015/0236828 A1* | 8/2015 | Park | H04L 5/0094 375/340 |
| 2015/0289235 A1* | 10/2015 | Park | H04L 5/001 370/329 |
| 2016/0006553 A1* | 1/2016 | Kim | H04L 1/1671 370/252 |

FOREIGN PATENT DOCUMENTS

| | | |
|---|---|---|
| CN | 102111197 A | 6/2011 |
| CN | 102256358 A | 11/2011 |
| CN | 102714566 A | 10/2012 |
| CN | 102958183 A | 3/2013 |
| JP | 2010050691 A | 3/2010 |
| WO | 2011130115 A1 | 10/2011 |
| WO | 2012110863 A1 | 8/2012 |

OTHER PUBLICATIONS

International Search Report in international application No. PCT/CN2013/090970, dated Mar. 27, 2014, 2 pgs.
English Translation of the Written Opinion of the International Search Authority in international application No. PCT/CN2013/090970, dated Mar. 27, 2014, 11 pgs.
The partial supplementary European Search Report in European application No. 13881523.8, dated Feb. 8, 2016, 7 pgs.

* cited by examiner

METHOD FOR ENSURING CHANNEL CONTINUITY AFTER PRECODING, BASE STATION, UE, AND COMPUTER READABLE STORAGE MEDIUM

TECHNICAL FIELD

The disclosure relates to precoding in the field of communication, and in particular to a method for ensuring continuity of a precoded channel, Evolved NodeB (eNB), User Equipment (UE), and non-transitory computer-readable storage medium.

BACKGROUND

Precoding/Beamforming (BF) is common technology in an existing Time Division Duplexing (TDD) system in radio communication. As BF in a broader sense, Precoding allows to improve receiving performance of a receiving end through signal weighting at a sending end. Due to channel reciprocity in a TDD system, an Evolved NodeB (eNB) may determine a downlink channel by estimating an uplink channel, and improve receiving-side demodulation performance through the eNB-side Precoding, thereby enhancing system capacity and spectrum utilization.

For example, in a Time Division Dulpexing Long Term Evolution (TDD-LTE) system, there may be two Precoding modes as follows.

In the first Precoding mode, downlink Precoding may be performed according to an uplink channel weight using reciprocity of a TDD system. Given complexity and feasibility of a real system and real equipment, a grain size of a Resource Block (RB) is adopted for a BF weight, where a separate BF weight vector may be adopted for each RB.

In the second Precoding mode, when a Precoding Matrix Indicator-Rank Indicator (PMI-RI) report is enabled, Precoding may be performed by feedback using a default grain size of a Physical Resource Block (PRB) bundling. In an existing standard, a PRB bundling, in general of 1 RB to 3 RBs in size, is referred to as one Precoding Resource block Group (PRG).

There is no constraint in the first Precoding mode in the existing standard. An eNB may perform Precoding using a grain size of an RB/RB group. The number of RBs in the RB group may be decided by the eNB per se. A UE-default grain size for channel estimation may be of a single RB. An inter-RB/RB group channel phase may no longer be continuous, but become fragmented. In the second Precoding mode, identical Precoding weights may be used for consecutive RBs within a PRG, although an inter-PRG phase may still be discontinuous and fragmented. A UE may perform channel estimation according to the grain size of a PRG, in which case identical weights may be used for the RBs in a PRG, lowering a forming gain to an extent, which is disadvantageous for a TDD system. Both modes may lead to a discontinuous frequency-domain equivalent channel received by a receiving end even with continuous frequency-domain physical resource scheduling by a UE. The UE can only perform channel estimation and demodulation according to a default minimal grain size (RB/PRG).

As the channel phase is originally continuous among RBs in the frequency domain, a channel estimation operation for a downlink Demodulation Reference Signal (DMRS)/pilot as follows shall not be performed due to the existence of phase discontinuity:

1) noise reduction by time-domain/frequency-domain joint channel estimation based on pilots on consecutive RBs; and 2) interpolation based on channel estimation in the time domain/frequency domain, which will lead to a larger error in channel estimation, impacting Precoding performance of the TDD system.

It may be seen that with existing implementation, UE-side channel estimation can be performed only under a relatively small grain size, leading to limited accuracy in channel estimation and poor demodulation performance, thereby impacting overall system performance and spectrum efficiency.

SUMMARY

Embodiments herein may provide a method for ensuring continuity of a precoded channel, eNB, UE, and non-transitory computer-readable storage medium.

According to an embodiment herein, a method for ensuring continuity of a precoded channel includes:

informing, by an Evolved NodeB eNB, a User Equipment UE whether data sent to the UE by the eNB are precoded according to frequency-domain continuous Precoding; and sending, by the eNB, the UE data that are precoded according to the frequency-domain continuous or discontinuous Precoding accordingly as the UE is informed.

According to an embodiment herein, a method for ensuring continuity of a precoded channel, includes:

when a User Equipment UE determines, according to information sent by an Evolved NodeB eNB, that frequency-domain continuous Precoding is adopted for data sent by the eNB to the UE, executing, by the UE within processing capability of the UE, optimized channel estimation and demodulation.

According to an embodiment herein, an Evolved NodeB eNB includes:

a signaling indicator module configured for: informing a User Equipment UE whether data sent to the UE by the eNB are precoded according to frequency-domain continuous Precoding; and a Precoding module configured for: sending the UE data that are precoded according to the frequency-domain continuous or discontinuous Precoding accordingly as the UE is informed.

According to an embodiment herein, a User Equipment UE includes:

a signaling receiving module configured for: receiving information sent by an Evolved NodeB eNB; and a channel estimation and demodulation module configured for: when it is determined that frequency-domain continuous Precoding is adopted for data sent by the eNB to the UE, executing optimized channel estimation and demodulation within processing capability of the UE.

According to an embodiment herein, a non-transitory computer-readable storage medium includes a set of instructions configured for: executing the method for ensuring continuity of a precoded channel at an eNB side.

According to an embodiment herein, a non-transitory computer-readable storage medium includes a set of instructions configured for: executing the method for ensuring continuity of a precoded channel at a UE side.

With a method for ensuring continuity of a precoded channel, eNB, UE, and non-transitory computer-readable storage medium according to embodiments herein, an eNB may inform a UE whether data sent by the eNB are continuously precoded on the frequency domain; accordingly, when the UE determines that data sent by the eNB are continuously precoded on the frequency domain, the UE may execute, within processing capability of the UE, optimized channel estimation and demodulation. With an embodiment herein, continuity of a precoded channel may be ensured, such that a UE may adopt a better channel estimation and demodulation algorithm, thereby improving system performance and spectrum efficiency.

DETAILED DESCRIPTION

A technical solution herein is elaborated below with reference to the accompanying drawings and embodiments.

Figure 1:
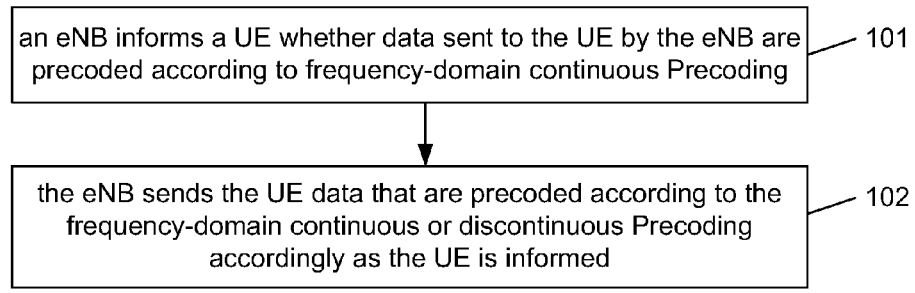
FIG. 1 is a flowchart of a method for ensuring continuity of a precoded channel according to an embodiment herein.

A method for ensuring continuity of a precoded channel according to an embodiment herein, corresponding to an implementing flow at an eNB side, as shown in FIG. 1, mainly includes steps as follows.

In step 101, an eNB informs a UE whether data sent to the UE by the eNB are precoded according to frequency-domain continuous Precoding.

When the eNB informs the UE that frequency-domain continuous Precoding is adopted for data sent by the eNB to the UE, the eNB sends the UE data precoded according to continuous precoding on the frequency domain. When the eNB informs the UE that data sent by the eNB to the UE are not precoded by continuous Precoding on the frequency domain, the eNB sends the UE data precoded by discontinuous Precoding on the frequency domain.

In an embodiment, the eNB explicitly or implicitly informs the UE whether frequency-domain continuous Precoding is adopted at the sending end. The continuous Precoding may be achieved by optimizing phases and amplitudes of physically continuous distinct Precoding weights to ensure continuity thereof on the frequency domain.

The eNB may inform the UE explicitly by Cell-Specific signaling or UE-Specific signaling, whether data sent to the UE by the eNB are precoded according to frequency-domain continuous Precoding.

Cell-Specific signaling may be used for indicating whether data sent to the UE by the eNB are processed according to the continuous Precoding. The Cell-Specific signaling may be System Information Block (SIB) message signaling. That is, the precoding in a cell may ensure a continuous downlink precoded equivalent channel for any UE in a cell. A parameter for such signaling may occupy 1 bit.

UE-Specific signaling may be used for indicating whether data sent to the UE by the eNB are processed according to the continuous Precoding. The UE-Specific signaling may be Radio Resource Control (RRC) message signaling. That is, the precoding for a UE in a cell may ensure a continuous downlink precoded equivalent channel. Such UE-Specific signaling may also occupy some bits of some DCI message signaling. A parameter for such signaling may occupy 1 bit.

Note that the UE may be informed of the precoding mode explicitly in some other ways. Embodiments herein are not limited to constructing SIB message signaling, RRC message signaling, or DCI message signaling.

The eNB may inform the UE implicitly by bundling with a transfer mode or a Downlink Control Information (DCI) type, whether data sent to the UE by the eNB are precoded according to frequency-domain continuous Precoding. That is, the eNB may be constrained to perform continuous sending-end Precoding and forming without explicit signaling.

The transfer mode may include a property as follows. In the transfer mode, for any user for whom precoding is adopted, the eNB side will ensure, through sending-end processing, a continuous equivalent channel at a receiving end thereof.

The DCI type may include a property as follows. Whenever the UE detects DCI of such a type, by default continuity of a receiving-end equivalent channel has been ensured by precoding at the eNB.

Note that the UE may be informed of the precoding mode implicitly in some other ways. Embodiments herein are not limited to constructing a transfer mode or a DCI type.

In step 102, the eNB sends the UE data that are precoded according to the frequency-domain continuous or discontinuous Precoding accordingly as the UE is informed.

The eNB may precode data to be sent to the UE according to the frequency-domain continuous Precoding as follows.

For each RB occupied by the UE, the eNB may acquire a Precoding weight on the RB occupied by the UE.

For each RB occupied by the UE, the eNB may optimize the Precoding weight on the RB occupied by the UE to obtain continuous Precoding weights on physically consecutive RBs.

The eNB may perform Precoding forming on the data to be sent to the UE according to an optimized Precoding weight.

The Precoding weight on the RB occupied by the UE may be optimized in an optimization mode including, but not limited to those as follows.

In a first optimization mode, continuous Precoding weights in units of RBs on a section of physically consecutive RBs may be adopted.

In a second optimization mode, continuous Precoding weights within a grain of a grain size of a number of RBs may be adopted, and continuous or discontinuous Precoding weights between grains of the grain size may be adopted. The eNB may inform the UE of the grain size. The eNB and the UE may agree on the grain size in advance. The grain size may be of a PRG or an RBG.

The optimization mode may be a default mode agreed on, or the eNB may also inform the UE of the optimization mode as follows, for example.

In a default mode, such as a mode 1, once the eNB is configured with the continuous Precoding, on each section of continuous frequency-domain resources of the UE, inter-RB Precoding weights may all be continuous, with Precoding in units of RBs.

In a default mode, such as a mode 2, once the eNB is configured with the continuous Precoding, Precoding weights for the UE may be continuous under a grain size.

When the eNB informs the UE of the optimization mode, the eNB may be configured with the continuous Precoding, and may inform the UE that the eNB has adopted the mode 1 or the mode 2. Note that such informing may be Cell-Specific or UE-Specific.

That is, The eNB and the UE may agree in advance on the optimization mode adopted by the eNB. The eNB may inform the UE of the optimization mode adopted by the eNB. The eNB may perform such informing in a mode same as or different from that in which the eNB informs the UE whether data sent to the UE by the eNB are precoded according to frequency-domain continuous Precoding.

Note that Precoding according to an embodiment herein may cover BF.

Figure 2:
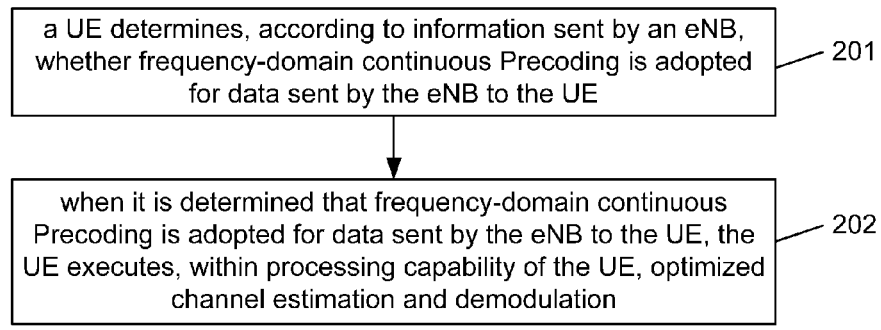
FIG. 2 is a flowchart of a method for ensuring continuity of a precoded channel according to another embodiment herein.

A method for ensuring continuity of a precoded channel according to another embodiment herein, corresponding to an implementing flow at a UE side, as shown in FIG. 2, mainly includes steps as follows.

In step 201, a UE determines, according to information sent by an eNB, whether frequency-domain continuous Precoding is adopted for data sent by the eNB to the UE.

The eNB may perform such informing explicitly or implicitly as explained, which is not repeated.

Note that once the UE has determined that data sent by the eNB to the UE are not precoded by continuous Precoding on the frequency domain, the UE may process data sent by the eNB routinely.

In step 202, when it is determined that frequency-domain continuous Precoding is adopted for data sent by the eNB to the UE, the UE executes, within processing capability of the UE, optimized channel estimation and demodulation.

Consider that the UE is informed explicitly. When the UE receives signaling of the eNB indicating continuous Precoding, the UE may deem a channel to be continuous on allocated consecutive RBs. The UE may improve demodulating capability of the UE through an operation improving accuracy in channel estimation, such as by time-domain/frequency-domain noise reduction and/or interpolation in channel estimation, by combining multiple consecutive RBs according to capability per se. Otherwise when signaled of discontinuous Precoding, the UE may deem by default that Precoding is discontinuous on allocated consecutive RBs, and thereby perform channel estimation and demodulation within a precoding grain.

Consider that the UE is informed implicitly. It may be specified that the eNB may adopt continuous Precoding for any UE, and inform a UE such information implicitly. Then by default the UE may always deem a received equivalent channel to be continuous on allocated consecutive RBs, and may perform optimized channel estimation and demodulation. For an LTE system, given forward compatibility, for example, an existing eNB and an existing UE meeting a release before R11(Release 11) do not have such a property, which has to be implemented on an eNB and a UE after R11. When an R11-(including R11 and a prior-R11 release) UE accesses an R11+(a post-R11 release) eNB having the property, even though the eNB may send data precoded continuously, the UE may still perform channel estimation and demodulation with a minimal Precoding grain size according to an existing mode. When an R11+UE accesses an R11-eNB without the property, as the eNB may still send data precoded discontinuously on the frequency domain by DCI or in an existing sending mode, the UE still has to perform channel estimation and demodulation with a minimal Precoding grain size.

The optimized channel estimation may include at least one of:
 time-domain noise filtering combining pilots on multiple RBs;
 frequency-domain noise filtering combining pilots on multiple RBs;
 frequency-domain interpolation combining pilots on multiple RBs; and
 time-domain interpolation combining pilots on multiple RBs.

According to an embodiment herein, an eNB may indicate a UE whether precoding by the eNB for the UE is continuous; once the UE identifies the indication, when the UE supports demodulation under continuous precoding, the UE may perform optimized channel estimation and demodulation, such as joint channel estimation with pilots on multiple RBs; when the UE supports no demodulation under continuous precoding, channel estimation and demodulation may be performed according to a minimal Precoding unit. In addition, an embodiment herein may reserve forward compatibility, in that a UE that cannot identify the indication may still perform channel estimation and demodulation according to a grain size of a minimal Precoding unit.

The method for ensuring continuity of a precoded channel may be elaborated below with reference to further embodiments.

In a TDD-LTE system according to an embodiment 1 herein, a flow as follows may be executed.

In step 1, an eNB may inform a UE through Cell-Specific signaling, that the eNB precodes data to be sent to the UE in a mode of continuous Precoding in the frequency domain. Such signaling may be located in a SIB message, occupying 1 bit.

In step 2, the eNB may send the UE data precoded in the mode of continuous Precoding in the frequency domain. The process may be as follows.

For each RB occupied by the UE, the eNB may acquire a Precoding weight on the RB occupied by the UE.

For each RB occupied by the UE, the eNB may optimize the Precoding weight on the RB occupied by the UE to obtain continuous Precoding weights on physically consecutive RBs. Said continuity may include phase continuity and amplitude continuity.

The eNB may perform Precoding forming on the data to be sent to the UE according to an optimized Precoding weight.

In step 3, the UE may receive data sent by the eNB, perform, within the processing capability of the UE, channel estimation and demodulation by combining pilots on multiple physically consecutive RBs. The channel estimation may include at least one of: time-domain noise filtering combining multiple pilots; frequency-domain noise filtering combining multiple pilots; frequency-domain interpolation combining multiple pilots; time-domain interpolation combining multiple pilots.

In the embodiment, a UE may be told through Cell-Specific signaling whether frequency-domain continuous Precoding is adopted. Such information may be issued through SIB message signaling. Any UE capable of identifying the information can learn whether an equivalent receiving channel of the UE is continuous. A better channel estimation scheme may be adopted for such a continuous channel, improving demodulation performance, thereby improving spectrum efficiency.

In a TDD-LTE system according to an embodiment 2 herein, a flow may be executed as follows.

In step 1, an eNB may inform a UE through UE-Specific signaling, that the eNB precodes data to be sent to the UE in a mode of continuous Precoding in the frequency domain. Such signaling may be located in an RRC message or in DCI message signaling, occupying 1 bit.

In step 2, the eNB may send the UE data precoded in the mode of continuous Precoding in the frequency domain. The process may be as follows.

For each RB occupied by the UE, the eNB may acquire a Precoding weight on the RB occupied by the UE.

For each RB occupied by the UE, the eNB may optimize the Precoding weight on the RB occupied by the UE to obtain continuous Precoding weights on physically consecutive RBs. Said continuity may include phase continuity and amplitude continuity.

The eNB may perform Precoding forming on the data to be sent to the UE according to an optimized Precoding weight.

In step 3, the UE may receive data sent by the eNB, perform, within the processing capability of the UE, channel estimation and demodulation by combining pilots on multiple physically consecutive RBs. The channel estimation may include at least one of: time-domain noise filtering combining multiple pilots; frequency-domain noise filtering combining multiple pilots; frequency-domain interpolation combining multiple pilots; time-domain interpolation combining multiple pilots.

In the embodiment, a UE may be told through UE-Specific signaling whether frequency-domain continuous Precoding is adopted. Such information may be issued through RRC message signaling or DCI message signaling may be issued. The UE can then learn whether an equivalent receiving channel of the UE is continuous. A better channel estimation scheme may be adopted for such a continuous channel, improving demodulation performance, thereby improving spectrum efficiency.

In a TDD-LTE system according to an embodiment 3 herein, a flow may be executed as follows.

In step 1, by default an eNB may perform continuous sending-end Precoding, and implicitly inform the UE of the continuous Precoding. The eNB may inform the UE implicitly by bundling with a transfer mode or a DCI type, whether data sent to the UE by the eNB are precoded according to frequency-domain continuous Precoding.

In step 2, the UE may receive data sent by the eNB, perform, within the processing capability of the UE, channel estimation and demodulation by combining pilots on multiple physically consecutive RBs. The channel estimation may include at least one of: time-domain noise filtering combining multiple pilots; frequency-domain noise filtering combining multiple pilots; frequency-domain interpolation combining multiple pilots; time-domain interpolation combining multiple pilots.

In the embodiment, a UE is informed implicitly that frequency-domain continuous Precoding is adopted. Once the UE determines that the UE itself is in a transfer mode, or detects DCI of a type, the UE can learn that an equivalent receiving channel of the UE is continuous, so as to adopt a better channel estimation scheme, improving demodulation performance, thereby improving spectrum efficiency.

Figure 3:
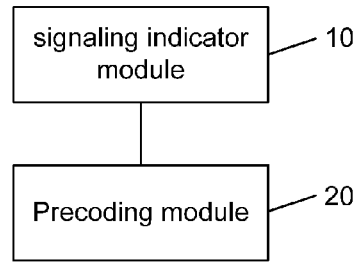
FIG. 3 is a diagram of a structure of an eNB according to an embodiment herein.

Corresponding to the method for ensuring continuity of a precoded channel, an embodiment herein may further provide an eNB, as shown in FIG. 3, mainly including:

a signaling indicator module 10 configured for: informing a UE whether data sent to the UE by the eNB are precoded according to frequency-domain continuous Precoding; and a Precoding module 20 configured for: sending the UE data that are precoded according to the frequency-domain continuous or discontinuous Precoding accordingly as the UE is informed.

In an embodiment, the eNB informs the UE whether data sent to the UE by the eNB are precoded according to frequency-domain continuous Precoding explicitly by Cell-Specific signaling or UE-Specific signaling.

In an embodiment, the Cell-Specific signaling may be SIB message signaling. In an embodiment, the UE-Specific signaling may be RRC message signaling or DCI message signaling.

In an embodiment, the eNB may inform the UE whether data sent to the UE by the eNB are precoded according to frequency-domain continuous Precoding implicitly by bundling with a transfer mode or a Downlink Control Information DCI type.

In an embodiment, the Precoding module 20 may be further configured for: for each RB occupied by the UE, acquiring a Precoding weight on the RB occupied by the UE;

optimizing the Precoding weight on the RB occupied by the UE to obtain continuous Precoding weights on physically consecutive RBs;

performing Precoding forming on the data to be sent to the UE according to an optimized Precoding weight.

In an embodiment, the Precoding module 20 may be further configured for optimizing the Precoding weight on an RB occupied by the UE in an optimization mode of:

adopting continuous Precoding weights in units of RBs on a section of physically consecutive RBs; or adopting continuous Precoding weights within a grain of a grain size of a number of RBs, and adopting continuous or discontinuous Precoding weights between grains of the grain size. The eNB may inform the UE of the grain size. The eNB and the UE may agree on the grain size in advance.

The optimization mode may be a default mode. The eNB may also inform the UE of the optimization mode.

The signaling indicator module 10 may be implemented by a communication chip having an external communication function in the eNB. The Precoding module 20 may be implemented by a Central Processing Unit (CPU), a Micro Processing Unit (MPU), a Digital Signal Processor (DSP), or a Field-Programmable Gate Array (FPGA) in the eNB.

Figure 4:
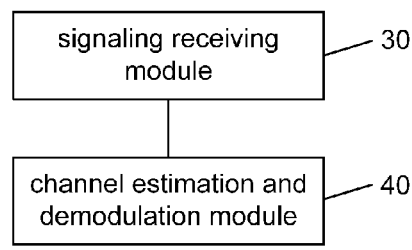
FIG. 4 is a diagram of a structure of a UE according to an embodiment herein.

Corresponding to a method for ensuring continuity of a precoded channel herein, an embodiment herein may further provide a UE, as shown in FIG. 4, mainly including:

a signaling receiving module 30 configured for: receiving information sent by an eNB; and a channel estimation and demodulation module 40 configured for: when it is determined that frequency-domain continuous Precoding is adopted for data sent by the eNB to the UE, executing optimized channel estimation and demodulation within processing capability of the UE.

In an embodiment, the optimized channel estimation comprises at least one of:

time-domain noise filtering combining pilots on multiple RBs;

frequency-domain noise filtering combining pilots on multiple RBs;

frequency-domain interpolation combining pilots on multiple RBs;

time-domain interpolation combining pilots on multiple RBs.

The signaling receiving module 30 may be implemented by a communication chip having an external communication function in the UE. The channel estimation and demodulation module 40 may be implemented by a CPU, an MPU, a DSP, or an FPGA in the UE.

To sum up, according to an embodiment herein, an eNB may inform a UE explicitly or implicitly whether data sent by the eNB are continuously precoded on the frequency domain; accordingly, when the UE determines that data sent by the eNB are continuously precoded on the frequency domain, the UE may execute, within processing capability of the UE, optimized channel estimation and demodulation. With the disclosure, continuity of a precoded channel may be ensured, such that a UE may adopt a better channel estimation and demodulation algorithm, thereby improving system performance and spectrum efficiency.

Those skilled in the art will know that an embodiment herein may provide a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

To this end, an embodiment herein may further provide a non-transitory computer-readable storage medium, including a set of computer-executable instructions configured for executing a method for ensuring continuity of a precoded channel on an eNB side.

An embodiment herein may further provide a non-transitory computer-readable storage medium, including a set of computer-executable instructions configured for executing a method for ensuring continuity of a precoded channel on a UE side.

What described are merely embodiments herein, and are not intended to limit the scope of the disclosure.

The invention claimed is:

1. A method for ensuring continuity of a precoded channel, comprising:
   informing, by an Evolved NodeB (eNB), a User Equipment (UE) that data to be sent to the UE by the eNB are precoded according to frequency-domain continuous Precoding; and
   sending, by the eNB, the UE the data that are precoded according to the frequency-domain continuous Precoding,
   wherein the sending, by the eNB, the UE the data that are precoded according to the frequency-domain continuous Precoding comprises:
      acquiring, by the eNB, a Precoding weight on a Resource Block (RB) occupied by the UE;
      optimizing, by the eNB, the Precoding weight on the RB occupied by the UE to obtain continuous Precoding weights on physically consecutive RBs in the frequency domain; and
      performing, by the eNB, Precoding forming on the data to be sent to the UE according to an optimized Precoding weight,
   wherein the Precoding weight on the RB occupied by the UE is optimized in an optimization mode of:
      adopting continuous Precoding weights within a grain of a grain size of a number of RBs in the frequency domain, and adopting continuous or discontinuous Precoding weights between grains of the grain size, wherein the eNB informs the UE of the grain size, or the eNB and the UE agree on the grain size in advance.

2. The method according to claim 1, wherein the eNB informs the UE that the data to be sent to the UE by the eNB are precoded according to frequency-domain continuous Precoding explicitly by Cell-Specific signaling or UE-Specific signaling.

3. The method according to claim 2, wherein the Cell-Specific signaling is System Information Block (SIB) message signaling, and the UE-Specific signaling is Radio Resource Control (RRC) message signaling or Downlink Control Information (DCI) message signaling.

4. The method according to claim 1, wherein the eNB informs the UE that the data to be sent to the UE by the eNB are precoded according to frequency-domain continuous Precoding implicitly by bundling with a transfer mode or a Downlink Control Information (DCI) type.

5. The method according to claim 1, wherein the grain size is of a Precoding Resource block Group (PRG) or an RB group (RBG).

6. The method according to claim 1, wherein the eNB and the UE agree in advance on the optimization mode adopted by the eNB;
   or the eNB informs the UE of the optimization mode adopted by the eNB, in a mode same as or different from that in which the eNB informs the UE that the data to be sent to the UE by the eNB are precoded according to frequency-domain continuous Precoding.

7. A method for ensuring continuity of a precoded channel, comprising:
   receiving, by a User Equipment (UE), information sent by an Evolved NodeB (eNB) indicating that data to be sent to the UE by the eNB are precoded according to frequency-domain continuous Precoding;
   determining, by the UE according to the information sent by the eNB, that frequency-domain continuous Precoding is adopted for the data to be sent by the eNB to the UE; and
   executing, by the UE within processing capability of the UE, optimized channel estimation and demodulation,
   wherein the optimized channel estimation comprises at least one of:
      time-domain noise filtering combining pilots on multiple consecutive RBs in a frequency domain;

frequency-domain noise filtering combining pilots on multiple consecutive RBs in the frequency domain;
frequency-domain interpolation combining pilots on multiple consecutive RBs in the frequency domain; or
time-domain interpolation combining pilots on multiple consecutive RBs in the frequency domain,
wherein the eNB sends the UE the data precoded according to the frequency-domain continuous Precoding by:
acquiring a Precoding weight on a Resource Block (RB) occupied by the UE in a frequency domain;
optimizing the Precoding weight on the RB occupied by the UE to obtain continuous Precoding weights on physically consecutive RBs in the frequency domain; and
performing Precoding forming on the data to be sent to the UE according to an optimized Precoding weight,
wherein the Precoding weight on the RB occupied by the UE is optimized in an optimization mode of:
adopting continuous Precoding weights within a grain of a grain size of a number of RBs in the frequency domain, and adopting continuous or discontinuous Precoding weights between grains of the grain size, wherein the eNB informs the UE of the grain size, or the eNB and the UE agree on the grain size in advance.

8. An Evolved NodeB (eNB), comprising:
a processor; and
a non-transitory computer-readable storage medium storing an instruction executable by the processor,
wherein the processor is configured for:
informing a User Equipment (UE) that data to be sent to the UE by the eNB are precoded according to frequency-domain continuous Precoding; and
sending the UE the data that are precoded according to the frequency-domain continuous Precoding,
wherein the sending the UE the data that are precoded according to the frequency-domain continuous Precoding comprises:
acquiring a Precoding weight on a Resource Block (RB) occupied by the UE in a frequency domain;
optimizing the Precoding weight on the RB occupied by the UE to obtain continuous Precoding weights on physically consecutive RBs in the frequency domain; and
performing Precoding forming on the data to be sent to the UE according to an optimized Precoding weight,
wherein the Precoding weight on the RB occupied by the UE is optimized in an optimization mode of:
adopting continuous Precoding weights within a grain of a grain size of a number of RBs in the frequency domain, and adopting continuous or discontinuous Precoding weights between grains of the grain size, wherein the eNB informs the UE of the grain size, or the eNB and the UE agree on the grain size in advance.

9. The eNB according to claim 8, wherein the eNB informs the UE that the data sent to the UE by the eNB are precoded according to frequency-domain continuous Precoding explicitly by Cell-Specific signaling or UE-Specific signaling.

10. The eNB according to claim 9, wherein the Cell-Specific signaling is System Information Block (SIB) message signaling, and the UE-Specific signaling is Radio Resource Control (RRC) message signaling or Downlink Control Information (DCI) message signaling.

11. The eNB according to claim 8, wherein the eNB informs the UE that the data to be sent to the UE by the eNB are precoded according to frequency-domain continuous Precoding implicitly by bundling with a transfer mode or a Downlink Control Information (DCI) type.

12. A User Equipment (UE), comprising:
a processor; and
a non-transitory computer-readable storage medium storing an instruction executable by the processor,
wherein the processor is configured for:
receiving information sent by an Evolved NodeB (eNB) indicating that data to be sent to the UE by the eNB are precoded according to frequency-domain continuous Precoding;
determining, according to the information sent by the eNB, that frequency-domain continuous Precoding is adopted for the data to be sent by the eNB to the UE; and
executing optimized channel estimation and demodulation within processing capability of the UE,
wherein the optimized channel estimation comprises at least one of:
time-domain noise filtering combining pilots on multiple consecutive RBs in a frequency domain;
frequency-domain noise filtering combining pilots on multiple consecutive RBs in the frequency domain;
frequency-domain interpolation combining pilots on multiple consecutive RBs in the frequency domain; or
time-domain interpolation combining pilots on multiple consecutive RBs in the frequency domain,
wherein the eNB sends the UE the data precoded according to the frequency-domain continuous Precoding by:
acquiring a Precoding weight on a Resource Block (RB) occupied by the UE in a frequency domain;
optimizing the Precoding weight on the RB occupied by the UE to obtain continuous Precoding weights on physically consecutive RBs in the frequency domain; and
performing Precoding forming on the data to be sent to the UE according to an optimized Precoding weight,
wherein the Precoding weight on the RB occupied by the UE is optimized in an optimization mode of:
adopting continuous Precoding weights within a grain of a grain size of a number of RBs in the frequency domain, and adopting continuous or discontinuous Precoding weights between grains of the grain size, wherein the eNB informs the UE of the grain size, or the eNB and the UE agree on the grain size in advance.

* * * * *